Figure 1:
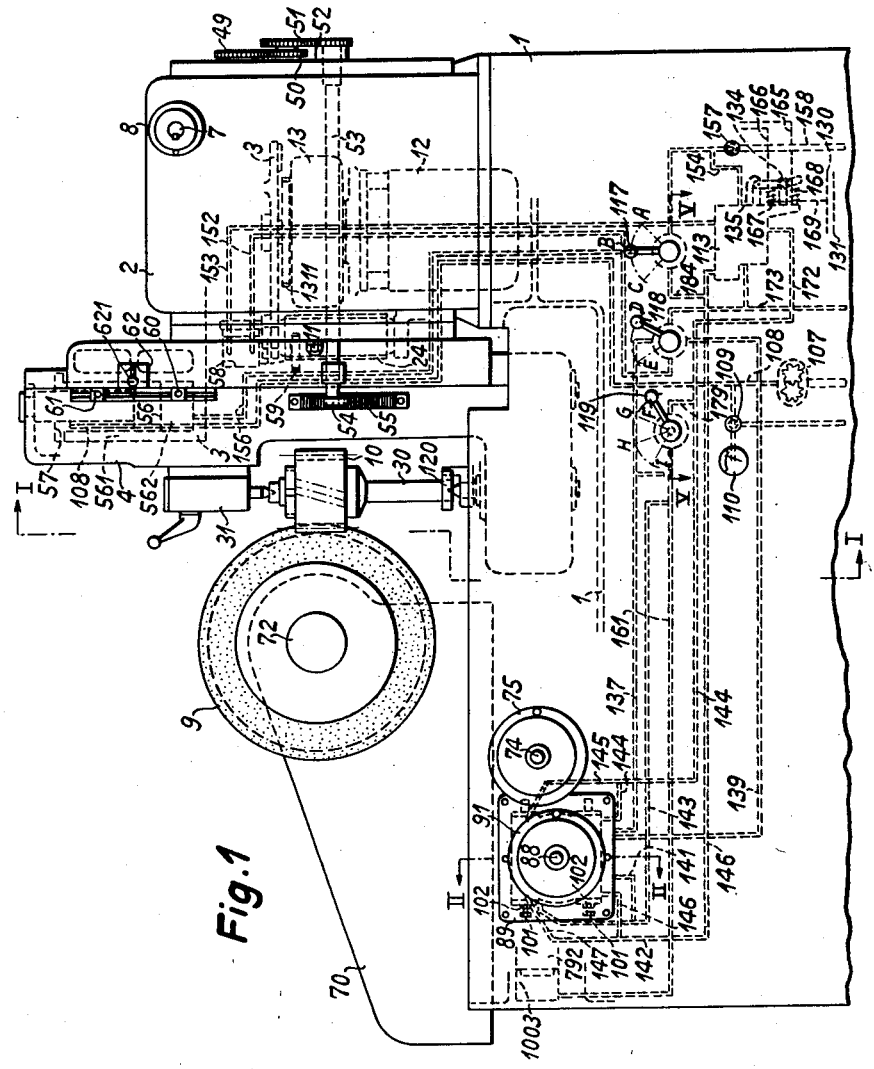

March 26, 1957 A. RICKENMANN 2,786,309
GEAR GRINDING MACHINE
Filed Aug. 7, 1953 8 Sheets-Sheet 1

INVENTOR
Alfred Rickenmann
BY Singer, Stern & Carlberg
ATTORNEYS

March 26, 1957  A. RICKENMANN  2,786,309
GEAR GRINDING MACHINE
Filed Aug. 7, 1953  8 Sheets-Sheet 2
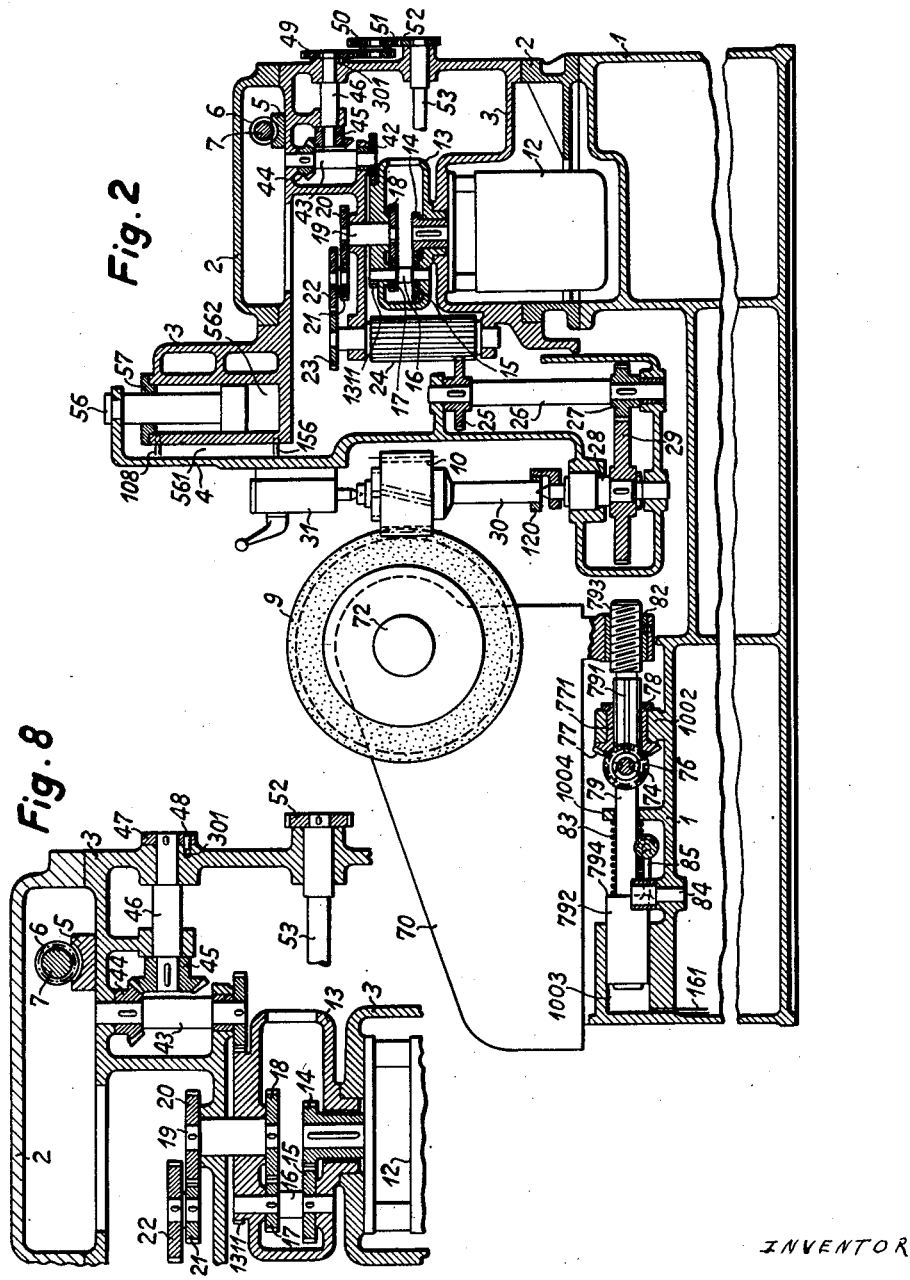
INVENTOR
Alfred Rickenmann
BY Singer Stern & Carlberg
ATTORNEYS.

March 26, 1957  A. RICKENMANN  2,786,309
GEAR GRINDING MACHINE
Filed Aug. 7, 1953.  8 Sheets-Sheet 3
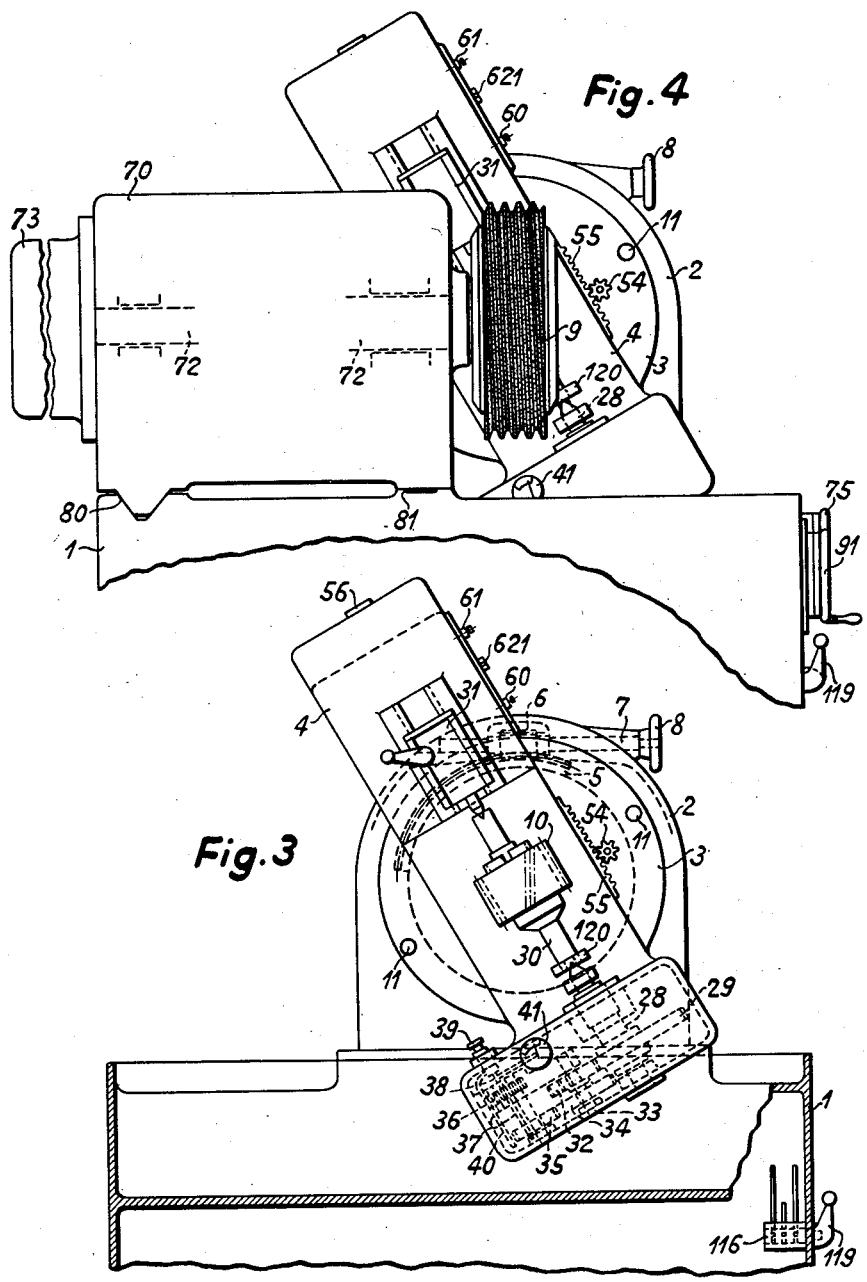
INVENTOR
Alfred Rickenmann
BY Singer Stern & Carlberg
ATTORNEYS March 26, 1957    A. RICKENMANN    2,786,309
GEAR GRINDING MACHINE
Filed Aug. 7, 1953    8 Sheets-Sheet 4
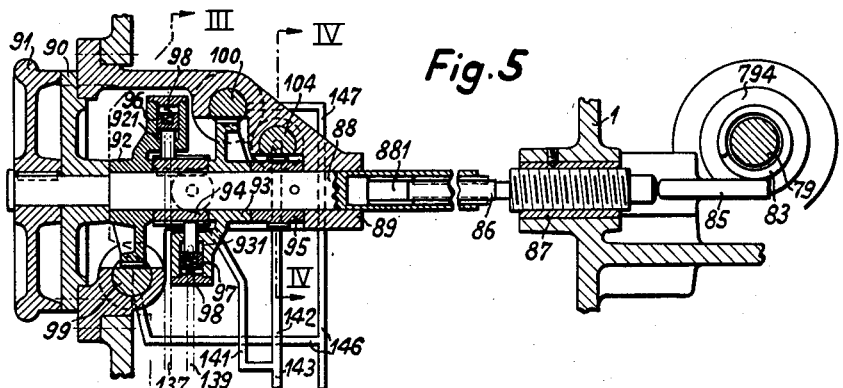
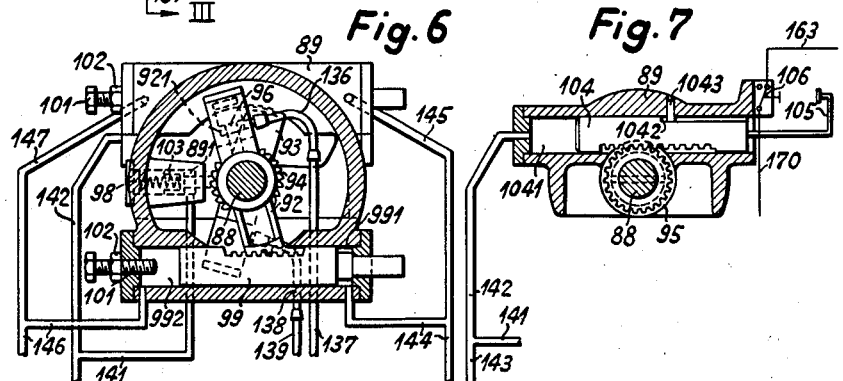
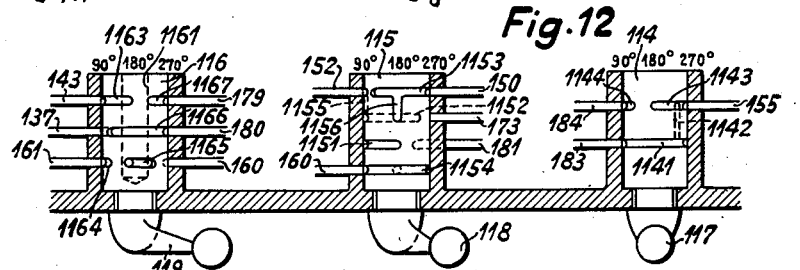
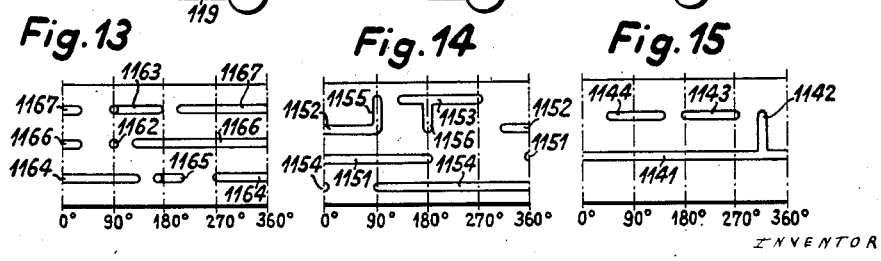
INVENTOR
Alfred Rickenmann
BY Singer Stern & Carlberg
ATTORNEYS.

March 26, 1957

A. RICKENMANN 2,786,309

GEAR GRINDING MACHINE

Filed Aug. 7, 1953

8 Sheets-Sheet 5

INVENTOR
Alfred Rickenmann
BY Singer Stern & Carlberg
ATTORNEYS.

March 26, 1957 A. RICKENMANN 2,786,309
GEAR GRINDING MACHINE
Filed Aug. 7, 1953 8 Sheets-Sheet 7
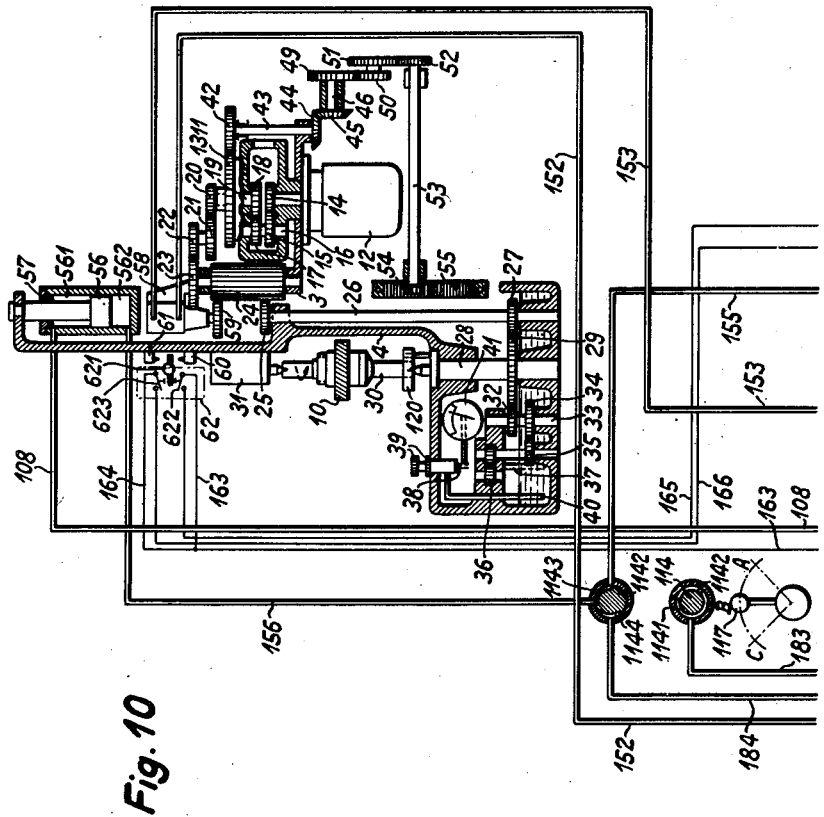
Fig.10
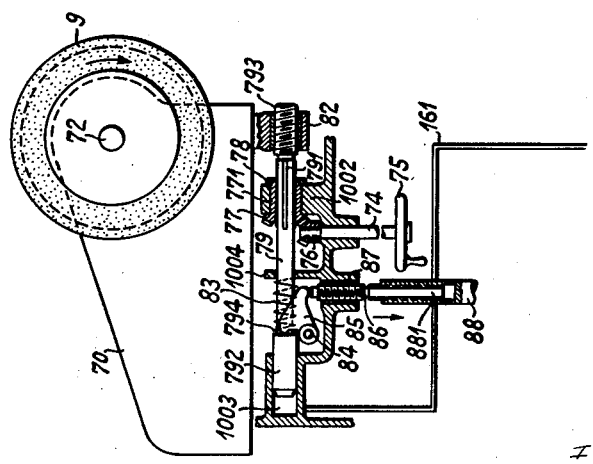
INVENTOR
Alfred Rickenmann
BY Singer Stern & Carlberg
ATTORNEYS.

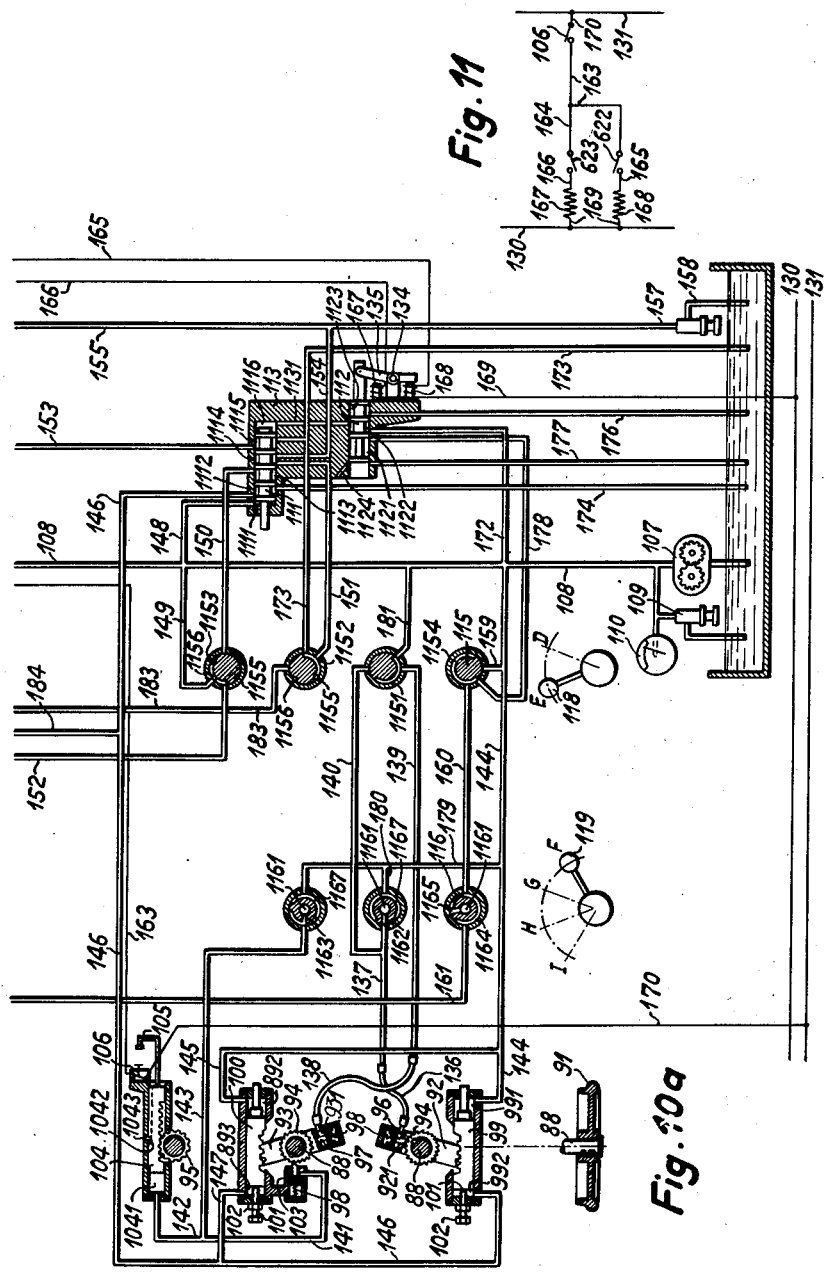

United States Patent Office 2,786,309
Patented Mar. 26, 1957

2,786,309

GEAR GRINDING MACHINE

Alfred Rickenmann, Kusnacht, near Zurich, Switzerland, assignor to Reishauer-Werkzeuge A.-G., Zurich, Switzerland Application August 7, 1953, Serial No. 373,003

Claims priority, application Germany May 2, 1953

4 Claims. (Cl. 51—95)

The invention relates to a gear grinding machine.

There are nowadays gear grinding machines in existence which operate according to the generating principle, which are suitable for the grinding of spur gears and helical gears. In known machines of this kind the slide for the work piece is shifted up-and-down or to-and-fro during the working process in the direction of the axis of rotation of the work piece, the said work piece being guided past the grinding worm.

In all machines of this kind known hitherto the grinding process on the work piece takes place during one direction of movement of the work slide only, for example during the upward movement. At the end of such a working stroke the grinding worm is withdrawn from the work piece a small distance. Subsequently the return stroke (for example the downward movement) of the work slide to its initial position is effected. In this return stroke no grinding work is carried out.

It is desirable to find ways and means which allow a shortening of the grinding time required hitherto.

It is a main object of the invention to provide a gear grinding machine which affords a solution to this problem in that by means of it the grinding process on the work piece can be effected in both directions of movement of the work slide.

It is another object of the invention to provide a gear grinding machine which allows to be operated alternatively in the manner of grinding in one direction of the movement of the work slide or in both directions thereof.

In the application of the method of grinding in both directions of movement of the work slide (which will be referred to as two-way grinding in what follows for brevity) the following difficulties and problems arise:

When grinding spur gears the rotation of the work piece is unequivocally determined by its teeth, and by the rotation and number of starts of the grinding worm. This rotational movement is in no way affected by the reversing and changes of direction of movement of the work slide.

However when helical gears have to be ground, an additional rotational movement must be imparted to the working spindle and/or to the work piece. The same is determined by the helix angle and by the diameter of the work piece, and must be derived from the movement of the work slide. This has the consequence that the sense of rotation of this required additional rotational movement likewise changes as soon as the work slide performs a change of direction of movement. In these circumstances there arises an inavoidable backlash within the train of gears involved in the change of direction. When no special means are provided, a certain period lapses, until this backlash is overcome and the train of gears affected thereby is again in positive working contact. This period has to be considered a loss because the grinding worm must not be in contact with the work piece as long as unstable conditions prevail in the drive of the work piece. Much over travel is necessary which prolongs the duration of the working process.

In the circumstances described the disadvantages occurring in the two-way grinding outweigh the advantages expected.

In order to obviate the unfavorable backlash occurring when reversing the movement of the work slide, hitherto a torque generator has been built into the train of gears affected by the change of rotational direction. By this additional device it has been attained that the gears thereof, which mesh with one another, perform a change of rotational direction without any backlash when reversing the work slide. In addition to this anti-backlash torque generator it was customary to build-in a power consumer, preferably operating with hydraulic means, into the drive of the work piece. The said power consumer has the object of preventing the variations in loading occurring during grinding from affecting unfavorably the drive of the work piece.

It is a further object of the present invention to provide a two-way gear grinding machine in which the power consumer arranged in the drive of the work piece performs in addition to the task allotted to it originally, the function of an anti-backlash torque generator.

With these and other objects in view I provide a machine for the grinding of spur gears and helical gears by the generating principle comprising in combination: a rotary grinding worm, a work slide mounted for reciprocative movement, and provided with a drive and means for rotatably supporting a work piece, control means connected to the said grinding worm moving the same radially with respect to the said work slide bringing the grinding worm in and out of grinding contact with the said work piece and switch-over means connected to the said control means and having one position in which the said grinding worm is kept in grinding contact with the said work piece during the movement of the said slide in one direction only, and another position in which the said grinding worm is kept in grinding contact with the said work piece during both directions of movement of the said slide.

Preferably I provide in addition to the combination as aforesaid: a power consumer built into the said drive of the work piece, the torque of which is so dimensioned that the variations in torque applied to a work spindle carrying the said work piece during the grinding operation are kept ineffective, and that the whole drive in operation during the grinding of helical gears is permanently loaded in such a manner that the elements of the said drive of the work piece contact one another always with the same contact faces, regardless of the direction of movement of the said work slide.

Figure 9:
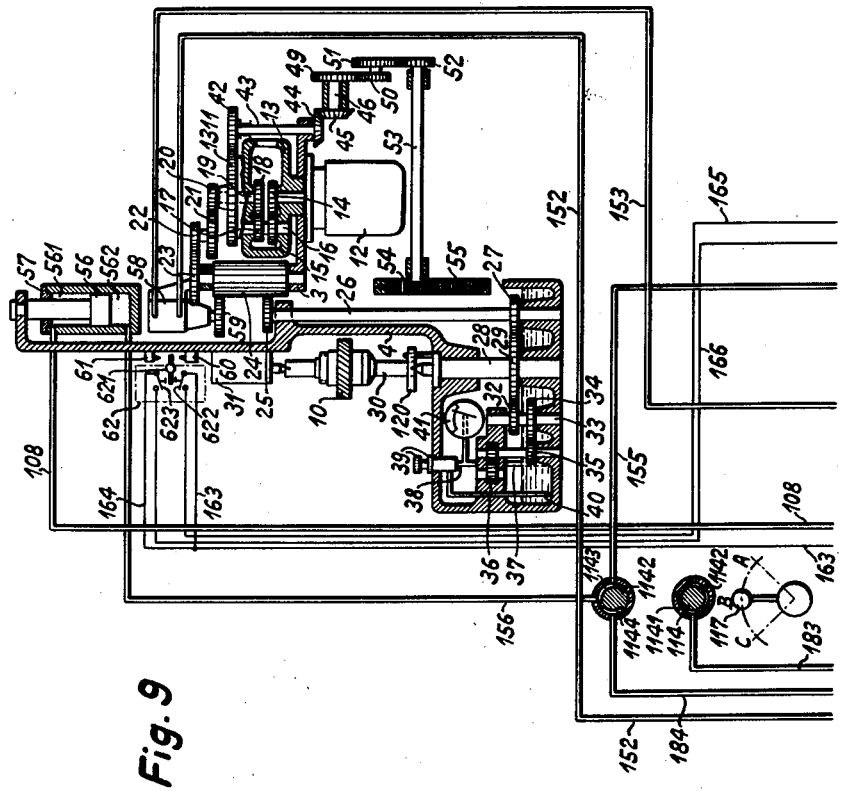
Figure 9A:
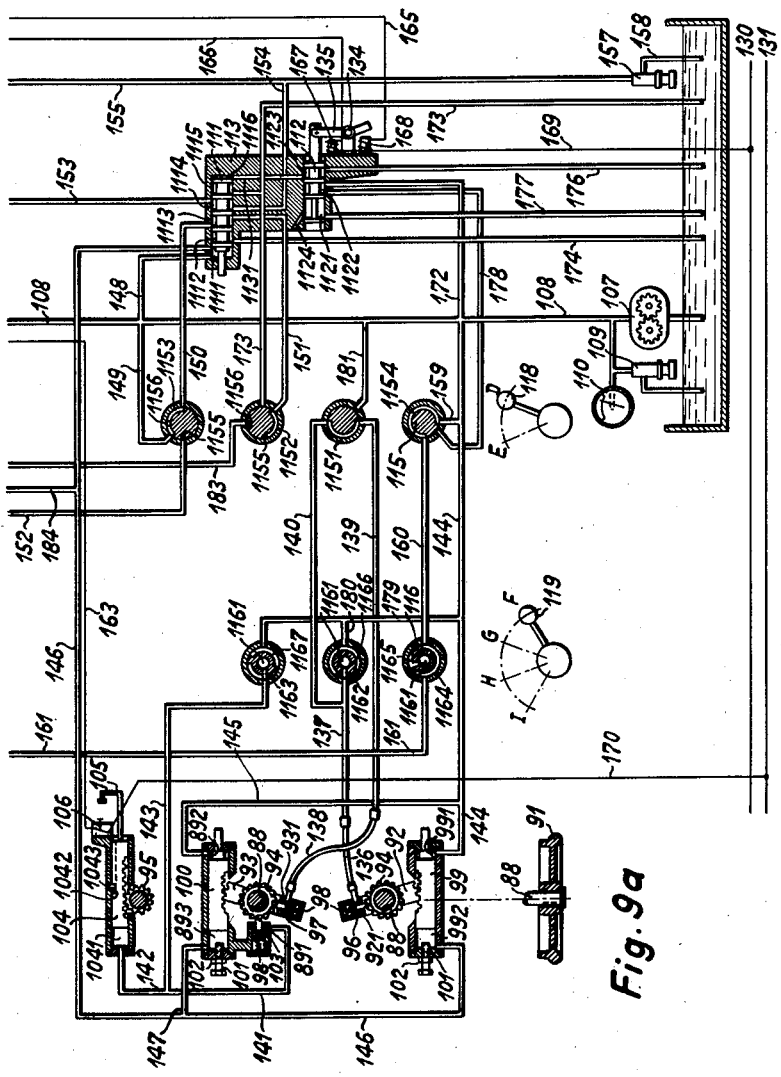

These and other objects and features of my present invention will become clear from the following description of an embodiment thereof given by way of example with reference to the accompanying drawings, in which:

Fig. 1 is a frontal elevation of the machine,

Fig. 2 is a longitudinal section of the work piece drive and the grinder carriage feed mechanism, Fig. 3 is a cross section through the machine along the line I—I of Fig. 1, Fig. 4 is a lateral elevation of the machine as seen from the left, Fig. 5 is a cross section through the automatic feed device along the line II—II of Fig. 1 on a larger scale, Fig. 6 is a cross section along the line III—III of Fig. 5, Fig. 7 is a cross section along the line IV—IV of Fig. 5, Fig. 8 is a part-view of the work piece drive mechanism in section, as a modification of, and on a larger scale than Fig. 2, Figs. 9, 10 respectively, and Figs. 9a, 10a respectively, illustrate the upper and lower portion of diagrammatic representations of the hydraulic and electric control devices in various phases of operation, Fig. 11 is a diagrammatic representation of the electric control devices, Fig. 12 shows details of the hydraulic control devices, partly in section, along the line V—V of Fig. 1 on a larger scale, and Figs. 13–15 show developed views of the rotatably arranged valves shown in Fig. 12.

CONSTRUCTION OF THE MACHINE

On the base 1 a support 2 is fixed in which a drum 3 is journalled which carries the shiftably arranged work slide 4. On the drum 3 a segment 5 of a worm wheel is mounted.

The associated worm 6 is mounted on a shaft 7 which is journalled in the support 2 and which can be turned by the aid of a hand wheel 8. This device serves for swivelling the drum 3 and the work slide 4 into an angular position which is dependent on the helix angle of the grinding worm 9 and on the helix angle of the work piece 10 when grinding helical gears. The angular position of the drum 3 and of the work slide 4 can be fixed by means of screws 11. The motor 12 for the drive of the work piece 10—in the present case a synchronous motor—is fixed to the drum 3. In a bore of the drum 3 coaxial to the axis of the said motor the cage 13 of a differential gearing is rotatably arranged and centred for the time being. On the shaft end of the motor 12 a spur gear pinion 14 is mounted which is in mesh with the spur gear 15. The latter is mounted on a shaft 16 which is rotatably journalled in the cage 13 and on which is mounted a further spur gear 17. The latter is in mesh with a spur gear 18 which transmits the rotational movement via the shaft 19 and the change gears 20, 21, 22, 23 to the pinion 24. The four change gears are selected and inserted in accordance with the number of teeth of the work piece 10. The pinion 24 is rotatably journalled in two bores of the drum 3.

A spur gear 25 in mesh with the pinion 24 is keyed to a drive shaft 26 which is rotatably journalled in the work slide 4. This shaft carries a further spur gear 27, which in turn is in mesh with a spur gear 29 mounted on the work spindle 28. The rotational movements of the work spindle 28 are transmitted by means of a dog 120 to the arbor 30 and to the work piece 10 clamped thereon. The arbor 30 is centred between the points of the work spindle 28 and of the tailstock 31. From the spur gear 29 moreover a gear pump 36 is driven through the gear 32, the intermediate shaft 33 and the gears 34, 35. The medium to be pumped, for example hydraulic oil, is taken from the head of the work slide 4 which is formed as a basin, and is fed into the pressure pipe 38. The latter leads to an adjustable pressure regulator valve 39 the discharge pipe 40 of which returns the overflowing hydraulic oil to the basin. The adjustment of the oil pressure desired is facilitated by the pressure gauge 41 attached to the pressure pipe 38.

When grinding spur gears, the cage 13 of the differential gearing is at a standstill. The toothed rim 1311 provided on the said cage 13 is in mesh with a spur gear 42 which is keyed together with a bevel gear 44, on the rotatably journalled shaft 43.

The bevel gear 44 meshes with a bevel gear 45 which is attached on the shaft 46. On the end of said shaft opposite the bevel gear 45 a disc 47 (see Fig. 8) is mounted. The latter is provided with a pin 48 which extends into a bore 301 provided on the drum 3. By this measure the cage 13, the spur gear 42, the shaft 43, the pair of bevel gears 44, 45 and the shaft 46 are locked.

When grinding helical gears an additional movement must be imparted to the work piece which is effected by means of the differential gearing, i. e. by rotating the cage 13. For this purpose the said disc 47, which is provided for the locking of the said cage 13, is removed, and a spur gear 49 is fixed to the shaft end concerned. The spur gear 49 together with three further spur gears 50, 51, 52 forms a set of change gears which is determined in accordance with the helical lead to be generated on the teeth of the work piece. The change gear 52 is mounted on a shaft 53 which is rotatably journalled in the drum 3 and which is provided with a spur gear 54. The latter is in mesh with a toothed rack 55 which is screwed to the work slide 4. The portion of the drum 3 projecting into the work slide 4 is constructed as a piston chamber. A piston 56 guided therein is fixed to the work slide 4. The piston chamber in the drum 3 is provided with a lid 57. The shifting of the work slide 4 is effected by means of the control oil. The amount of feed when grinding is determined by the controllable volume supplied by a so-called variable delivery pump 58 of any known construction. The latter is fixed to the drum 3 and is driven by the aid of a spur gear 59 from the pinion 24. The disposition of the variable delivery pump 58 within the control system will be described later. The two adjustable stops 60, 61 on the work slide 4 serve for the adjustment of the stroke required for the grinding. Between these stops 60, 61 a switch 62 is fixed to the drum 3.

Grinder carriage, feed mechanism

The grinder carriage 70 is horizontally superimposed on the base 1 and is horizontally shiftable. The grinding worm 9 is mounted on the shaft end of the grinder spindle 72 projecting towards the service side of the machine. The said spindle is rotatably journalled in the grinder carriage 70 and is directly coupled to the driving motor 73. The latter is flanged to the grinder carriage 70, and is constructed like the work piece motor 12 as a synchronous motor. For the shifting of the grinder carriage 70 two feed devices, independent of one another, are available. The hand operated feed device comprises a shaft 74 rotatably journalled in the base 1 which is provided with the hand wheel 75 and a bevel pinion 76. The latter is in mesh with another bevel gear 77 the hub 771 of which is guided in a bearing block 1002 of the base 1. A collar 78 mounted on the end of the hub prevents axial shifting thereof. The bore of the bevel gear 77 is adapted to receive that portion 791 of the spindle 79 which has a splined cross section. When turning the handwheel 75 the rotational movements are accordingly transmitted via the shaft 74 and the pair of bevel gears 76, 77 on to the spindle 79. The spindle 79 is arranged between the two-guide ways 80, 81 of the grinder carriage 70. The left end of the spindle 79 (see Figs. 2, 9, 10) is constructed as a piston 792 and is shiftably guided in the piston chamber 1003 of the base 1. The right hand end of the spindle 79 has a screw thread 793 connected with a nut 82 which is fixed in the grinder carriage 70. Between a rib 1004 of the base 1 and the front wall 794 of the piston 792 a compression spring 83 is supported which tends to push the spindle 79 and the grinder carriage 70 towards the left (see Figs. 2, 9, 10) i. e. away from the work piece 10. On a pivot 84 fixed to the base 1 a double-armed lever 85 is pivoted, one lever arm of which is in contact with the front wall 794 of the piston 792, while the other one contacts the end of a spindle 86. The latter is guided in a tapped sleeve 87 which is fixed in the base 1. The end of this spindle facing the service side of the machine is provided with two keys and projects into the bore 881 of the control shaft 88. The latter is journalled rotatably in the control support 89 and in the plate 90. The control support 89 is fixed to the base 1 and is closed on the front side by the plate 90. The control shaft 88 is provided with a hand wheel 91 keyed to it, with two control levers 92, 93 mounted idly on it, a ratchet wheel 94 and a spur gear 95. The control lever 92 is provided with a pawl 96, and likewise the control lever 93 with a pawl 97. Both pawls 96, 97 are formed as pistons and are constantly subjected to the action of the associated compression springs 98. The portions of the said control levers lying diametrically opposite the pawls are formed as toothed segments. The toothed portions of the control levers 92 and 93 respectively, are in mesh each with a toothed rack provided on a piston 99 and 100, respectively. These two pistons 99, 100 are mounted horizontally shiftable in the control support 89. The piston strokes can be adjusted by the aid of two screws 101 and fixed by the nuts 102. A third pawl 103 which is likewise under the action of a compression spring 98, is likewise arranged on the control support 89. A spur gear 95 fixed on the control shaft 88 is in mesh with the toothed rack portion of the return piston 104. The latter is guided in the control support 89 and moves in operation from the right to the left (see Figs. 9a and 10a). On the return piston 104 a control rod 105 is attached which operates the switch 106 as soon as the left hand end position is reached.

CONTROL DEVICES

For the control of the machine the following devices are provided, in addition to the control members mentioned hereinabove with reference to the description of the work piece drive and of the feed device:

The pressure oil required for the hydraulic control is fed by a gear pump 107 from the basin provided in the base 1 into a central pressure pipe 108. For the control and adjustment of the oil pressure desired, a pressure control valve 109 and pressure gauge 110 are provided. For the distribution of the pressure oil a control block 113, provided with two pistons 111, 112 and three rotatably arranged valves 114, 115, 116 are available. The valve 114, which is provided with the control lever 117, can be used in three positions marked A, B, C respectively. The position A is used in the first place for the setting of the machine, when the work slide 4 has to be shifted quickly upwards and downwards. The position B is to be adjusted for working, whereas the position C allows the arresting of the work slide 4 in any position desired.

The position of the valve 115 which is fixed by means of the lever 118 determines the working method. When the position D is selected, grinding takes place during the up- and the down-movement of the work slide 4, i. e. the grinding is effected according to the two-way method. The position E is in consideration when the grinding process is to be carried out in one direction only, so that for example the grinding worm 9 operates on the work piece during the upward movement of the work slide 4 only, and is withdrawn a short distance during the downward movement.

The lever 119 serves for the adjustment of the valve 116. The latter can be adjusted in four different positions F, G, H, I. When the valve 116 is in the position F the feed movements succeed one another automatically. The position G is required when the grinder carriage 70 has to be shifted from a rear position into the working position. On the other hand the grinder carriage moves back at once when the valve 116 is turned to the position H. The position I is selected when at the end of a working process the components taking part in the feed of the grinding worm have to be restored to the initial position.

For the feeding of the control circuits a main having the two conductors 130, 131 is available. On the control block 113 two magnet coils 167, 168 are mounted. The same are arranged on both sides of the pivot axis 134 of the control lever 135 which is likewise pivoted on the control block 113. The said control lever 135 is connected to the control piston 112.

THE PHASES OF THE WORKING PROCESS (a) Two-way grinding

The conditions represented in Fig. 9 have been elected the starting point for the following considerations:

The lever 117 and the associated valve 114 are in the position B prescribed for the grinding. The lever 118 and the associated valve 115 are in the position D so that the control is set for "two-way grinding." On the other hand, the feed of the grinder carriage 70 is effected automatically because the lever 119 and the associated valve 116 are in the corresponding position denoted F. It is to be noted that in these conditions all the pawls 96, 97, 103 are pressed by the springs 98 on to the ratchet wheel 94, because all the associated chambers 921, 931, 891 are released. The chamber 921 is in communication with drainage hole 1161 through the flexible intermediate piece 136, the pipe 137 and the radially arranged bore 1162; the chamber 931 is likewise in communication with the drainage hole 1161 through the flexible intermediate piece 138, the pipe 139, the groove 1151 and the pipe 140, which leads to the aforesaid pipe 137. The chamber 891 is drained through the pipes 141, 143 and the radial bore 1163, which latter likewise issues into the drainage hole 1161. Moreover there is communication via the pipe 142 between the aforesaid pipe 143 and the chamber 1041 so that the control oil can escape when the return piston 104 moves towards the left. Both pistons 99, 100 are in their right hand end positions. The piston chambers 991, 992 are both under pressure; the chamber 991 is in communication through the pipe 144 with the centrally disposed pressure pipe 108, and the chamber 992 is supplied with pressure oil via the pipe 146, the chamber 1111 and the pipe 148 which is connected to the pressure pipe 108. Since the area exposed to pressure on the left hand side of the piston 99 is larger than that on the right hand side, the said piston remains in the position illustrated in Fig. 9. The same conditions apply to piston 100. The chamber 892 is in communication with the aforesaid pipe 144 carrying pressure liquid via the pipe 145, and the chamber 893 is in communication via pipe 147 to the pipe 146 which in the operational phase represented also carries liquid under pressure. The grinder carriage 70 is permanently pressed towards the right (Figs. 2, 9) since the chamber 1003 is under pressure. The position of the spindle 79 is determined by the position of the spindle 86 on which abuts the double-armed lever 85 which is in contact with the frontal face 794 of the piston 792. Pressure liquid passes from the pipe 108 through the pipes 144, 159, groove 1154, the pipe 160, the groove 1164 and the pipe 161 into the chamber 1003.

When the lever 117 and the valve 114 are in the position B represented in Fig. 9 the following conditions prevail on the side of the work piece:

The chamber 561 in the drum 3 is in direct communication with the pressure pipe 108. Moreover, pressure liquid flows from the pressure pipe 108 through the pipe 149, the groove 1153, the pipe 150, the chamber 1113, the pipe 151, the groove 1152 and the longitudinal groove 1155 into the pipe 152 and into the variable delivery pump 58. The oil fed by the latter into the pipe 153 passes the control block 113 via the chamber 1114 and the pipe 154 and finally flows via the pipe 155, the groove 1143 and the pipe 156 into the chamber 562 below the piston 56. The maximum pressure of the pipe system between the chamber 562 and the variable delivery pump 58 as described hereinabove is determined by the position of the pressure control valve 157 which is arranged at the end of the pipe 155. This pressure is adjusted for example slightly lower than the pressure read off on the pressure gauge 110. On the basis of these conditions, the work slide 4 moves upwards at operational speed, because the area exposed to the liquid of the piston 56 is larger on the side of the chamber 562 than on the side of the chamber 561.

Provided there are no special devices arranged, the loads, and fluctuations in load, occurring during the grinding determine the torque required on the work spindle 28 and variations in the torque. In order to prevent the disturbance of uniformity of the work piece drive which consequently would be expected, a power consumer, in the present case a gear pump 36, is included into the drive of the work piece. The pressure to be generated by this gear pump 36 is determined in accordance with the dimensions of the work piece 10 to be ground and is adjusted by means of a pressure regulator valve 39 and the pressure gauge 41. The pressure to be generated is selected in any case in such a manner that the torque consumed by the said gear pump 36 is notably larger than the torque and torque variations occurring when carrying out the grinding process.

The total torque required (torque for the grinding process plus torque for the gear pump 36) determines the output of the work piece motor 12. Since the cage 13 of the differential gearing is arranged rotatably, the same is subjected to a reaction torque. The latter is dependent upon the power required by and direction of rotation of the work piece motor 12, as regards magnitude and direction. Accordingly a circumferential force acts on the toothed rim 1311 of the cage 13. This force is transmitted on to the train of gears connected to the said toothed rim 1311. When grinding spur gears it acts finally on the pin 48 of the disc 47. The elements taking part in the drive of the work piece 10 rotate, regardless of the direction of movement of the work piece carriage 4, constantly in the same direction, while the elements 42—46 arranged between the toothed rim 1311 and the disc 47 are at a standstill. Any swinging to-and-fro thereof is prevented, because the circumferential force permanently acting on the toothed rim 1311 abolishes any play in the short gear train 42—46. Disturbances as a consequence of backlash are therefore not to be expected when grinding spur gears.

When grinding helical gears the action of the circumferential force on the toothed rim 1311 theoretically propagates itself right up to the last member of the gear train required for the drive of the cage 13. This leads to the consequence—still considered under ideal conditions—that the pinion 54 comes into contact with that flank of the toothed rack 55 which is unequivocally determined by the direction of the circumferential force on the toothed rim 1311 and the number of changes in the sense of rotation in the train of gears contemplated.

In the conditions actually met in practice the transmission ratios, efficiencies, bearing frictions of the gear train taking part in the drive of the cage 13 are to be taken in consideration. It has further to be considered that the transmission ratio of the change gears 49, 50, 51, 52 varies within wide limits, since the working range for the grinding of helical gears and for the generations of the helix lead prescribed is forcibly very large. Accordingly the pressure between the gear 54 and the toothed rack 55, and between any two intermeshing gears of the gear train in question varies as well. It has now been found that a circumferential force on the toothed rim 1311 as associated with the total torque required in the grinding of spur gears (torque for the grinding process plus torque for the power consumer) is inadequate in the grinding of helical gears. When reversing, the cage 13, the elements 42–46 and 49–55 change their direction of rotation. When now anywhere within the gear train contemplated, for example between the pinion 54 and the toothed rack 55 or between the change gears 51, 52 a very weak or too low a contact pressure prevails the gear train is incapable of following the change of direction of movement of the work slide 4 quickly enough, which forcibly has the consequence of undesirable backlash and of disturbances in the drive of the work piece. In order that these disturbances do not affect the accuracy of the gear to be ground, one has hitherto been compelled to make the stroke of the work slide 4 considerably larger than the width of the work piece 10. For this reason the advantages offering themselves in the application of the two-way grinding are brought to nothing. On the other hand, one has tried to arrange a special torque generator within the gear train under consideration which had the object of providing a quick compensation of the backlash occurring and which required complicated control devices.

A feature of the present invention resides in that the power consumer is combined with the aforesaid anti-backlash torque generator by selecting the pressure and/or torque of the gear pumps 36 in such a manner that on the one hand the fluctuation in torque occurring in grinding and acting on the work spindle 28 remain ineffective, and that on the other hand the whole gear train required in the grinding of helical gears is loaded in such a manner that the elements taking part always roll along the same flanks, regardless of the direction of movement of the work slide 4. The contact pressure between two intermeshing elements within the gear train affected by the change of direction of rotation when reversing the work slide 4 is selected so high that the contact of the flanks of the teeth is faultlessly safeguarded during any phase of operation. When the work slide 4 has reached the upper end position at the termination of its upward movement, the stop 60 turns the control lever 621 in the anti-clockwise direction (Fig. 9), which has the consequence of closing the switch 622. Thereby the magnet coil 168 is energized because the circuit between the conductors 130, 131 is established through the wire 170, the switch 166, the wire 163, the switch 622 (now closed), the wire 165, the magnet coil 168 and the wire 169. The double armed lever 135 consequently performs a rotational movement in the clockwise direction and thereby carries along the piston 112 towards the right. This has the consequence that pressure oil from the pipe 108 penetrates via the pipe 172, the chamber 1122 and the pipe 1131 into the chamber 1116 and shifts the piston 111 towards the left. The work slide 4 begins to descend, since oil from the pipe 108 penetrates into the chamber 561, while the oil contained in the chamber 562 is returned by the variable delivery pump 58 to the basin in the base at the rate of flow per unit time adjusted thereon. The oil flowing off takes the following path—chamber 562, pipe 156, groove 1143, pipe 155, pipe 154, chamber 1114, pipe 151, groove 1152, longitudinal groove 1155, pipe 152, variable delivery pump 58, pipe 153, chamber 1115, drainage pipe 173.

It should be noted that the work slide 4 descends now at exactly the same working speed as it had when performing its upward movement. As soon as the piston 111 has performed its movement towards the left, the pipe 146 is released of pressure. Consequently the oil permanently under pressure in the chambers 991, 892 forces the two pistons 99, 100 at once towards the left. The oil contained in the chamber 893 escapes via the pipe 147 into the pipe 146 which in turn carries also the oil deriving from the chamber 992, in order to get through the chamber 1112 into the drainage pipe 174 and into the basin. During the stroke of the piston 99 the control lever 92 turns forcibly in the clockwise direction. The pawl 96 mounted on it slides over the ratchet wheel 94. The control lever 93 operated by the piston 100, which likewise is on its stroke towards the left performs a rotational movement in the anti-clockwise direction. Consequently the pawl 97 transmits the rotational movement of the control lever 93 to the ratchet wheel 94 and to the control shaft 88 connected therewith. This control movement in the anti-clockwise direction of the control shaft 88 is forcibly performed also by the spur gear 95 and by the spindle 86. This rotational movement causes on the one hand shifting of the piston 104 towards the left, and on the other hand an axial movement of the spindle 86 in the direction of the arrow indicated at the left of it. These axial movements are forcibly followed by the double armed lever 85 and the spindle 79 which is constantly kept under axial pressure. The latter moves towards the right a distance coordinated to the rotational movement and to the pitch of the thread on the spindle 86, and thereby brings the grinder carriage 70 nearer to the work piece 10. Shortly after the beginning of the downward movement of the work slide 4 the stop 60 leaves the control lever 621, the switch 622 opens automatically and the coil 168 is disenergized. Further consequences are not therefore to be expected.

At the end of the downward movement of the work slide 4, the stop 61 turns the control lever 621 in the clockwise direction (Fig. 9), whereby the switch 623 is closed. This has the effect that the magnet coil 167 is energized because then a connection is established between the two conductors 130, 131 via the wire 170, switch 106, wire 163, 164, switch 623, wire 166, coil 167 and the wire 169. This has the consequence that the lever 135 performs a rotational movement in the anti-clockwise direction and that the piston 112 is shifted thereby towards the left into the position shown in Figs. 9 and 9a. As soon as this is the case, the chamber 1116 is relieved and the oil contained therein can flow off into the basin through the pipe 1131 the chamber 1123 and the pipe 176. At the same time the pressure oil constantly present in the chamber 1111, which flows thereto from the pipe 108 via the pipe 148, shifts the piston 111 towards the right into the position shown in Figs. 9 and 9a. In these circumstances the work slide 4 starts at once again its upward stroke since the variable delivery pump 58 again feeds pressure oil into the chamber 562 in a manner described hereinabove. From the chamber 1111 then pressure oil flows again into the pipe 146, and gets from there directly into the chamber 992, and moreover via the pipe 147 into the chamber 893. The two pistons 99, 100 consequently move at once towards the right into the position shown in Figs. 9 and 9a. During this movement, too, the two control levers 92, 93 are turned, namely the control lever 92 in the anti-clockwise direction, and the control lever 93 in the clockwise direction. In contradistinction to the conditions described hereinabove with reference to the beginning of the downward stroke of the work slide 4, the pawl 96 mounted on the control lever 92 remains now on the ratchet wheel 94 and effects a rotational movement in the anti-clockwise direction of the control shaft 88, coordinated to the stroke of the piston 99. This in turn leads to a feed movement of the grinder carriage 70 and to a corresponding shifting of the piston 104 towards the left. The pawl 97 mounted on the control lever 93 slides in these conditions over the ratchet wheel 94.

In this manner the control movements follow one another in the two-way grinding. At each reversal a feed movement takes place until the work piece is ground to a finish. Moreover the piston 104 travels towards the left at each feed movement and the distance between the switch 106 and the control rod 105 gets successively shorter. Finally the switch 106 is opened by the control rod 105 when the last feed movement takes place. This may occur in the two-way grinding process at the beginning of an upward- or of a downward-stroke of the work slide 4. At the end of this last stroke no electrical connection can be established between the conductors 130, 131 because the switch 106 is opened. The work slide 4 accordingly comes to a standstill at the end of the working process in the uppermost or lowermost end position reached. The control movements to be carried out subsequently i. e. between the end of a terminated working process and the beginning of the next one, with respect to the control occur as follows:

The lever 117 and the associated valve 114 are turned into the position C. By this action any connection to the pipe 156 is interrupted and the control oil can neither escape from the chamber 562 nor can it get thereto. The work slide 4 is thereby fixed in its position, regardless whether, in the operational condition considered at the present moment, it is in one of its end-positions or intermediately thereof. It will be noted, that when switching over to the position C a connection is established which allows the pressure oil to penetrate from the pipe 108 through the pipe 149, the groove 1153, the longitudinal groove 1156, the pipe 183, the annular groove 1141 and the longitudinal groove 1142 into the pipe 155. Thereby it is achieved that the pipe system in communication with the variable delivery pump 58 is constantly filled with control oil so that when the lever 117 and the associated valve 114 are turned back into the working position B any shock-like movement of the work slide 4 is prevented which under certain circumstances could lead to damaging the work piece 10. In this connection it should be noted that shifting of the work piece carriage 4 can be initiated at any moment at an express speed rate by turning the lever 117 and associated valve 114 into the position A whereby the communication between the variable delivery pump 58 and the chamber 562 is interrupted at once. When the switching over into the position A takes place during the upward movement of the work slide 4, pressure oil flows from the pipe 108 via the pipe 148, the chamber 1111, the pipe 146, the pipe 184, the groove 1144 and the pipe 156 into the chamber 562. Since in these conditions the quantity flowing in there is not dosed by the variable delivery pump 58, but can get under the piston 56 considerably quicker, the work slide 4 moves upwards at express speed rate. When moving downwards, the oil enclosed in the chamber 562 can be expelled quickly through the pipe 156, the groove 1144, the pipes 184, 146, the chamber 1112 and the pipe 174 into the basin.

As soon as at the end of a working process the lever 117 and associated valve 114 stand in the position B and consequently the work slide 4 is locked, the lever 119 and associated valve 116 are turned into the position G. Then pressure oil flows from the pipe 108 via the pipes 144, 179, 180, the groove 1166 and the pipes 137, 136 into the chamber 921 of the control lever 92. The chamber 931 which is similarly provided on the control lever 93 is also under pressure. The same is in communication via the pipes 138, 139 the groove 1151 and the pipe 140 with the pipe 137 which in these circumstances carries pressure oil. Both pawls 96, 97 are accordingly lifted off the ratchet wheel 94 at once. When turning the lever 119 and associated valve 116 further into the position H, the pipe 161 is put into communication with the drainage hole 1165. Thereby the chamber 1003 can be discharged. The spring 83 abutting between the rib 1004 of the base and the front wall 794 of the piston accordingly pushes the spindle 79 and the grinder carriage connected therewith towards the left whereby the grinding worm 9 is withdrawn from the work piece 10. The oil expelled by the piston 792 escapes via the pipe 161 and the drainage holes 1165, 1161 into the basin. The next rotational movement of the lever 119 and associated valve 116 into the position I has the effect that the pipe 143 comes into communication with the groove 1167. Consequently pressure oil from the pipe 108 flows through the pipes 144, 179, the groove 1167 into the pipe 143, and from there on the one hand via the pipe 141 into the chamber 891, and on the other hand via the pipe 142 into the chamber 1041. This has the consequence that the pawl 103 is likewise lifted off whereby the control shaft 88 is released for rotational movement in both directions. At the same time the control oil flowing into the chamber 1041 pushes the piston 104 into the right hand side end position which is reached when the front face 1042 abuts on the pin 1043. During the stroke of the piston 104 towards the right, the spur gear 95, the control shaft 88 and the spindle 86 are forcibly turned in the clockwise direction i. e. restored into the starting position. The turning movement of the lever 119 and associated valve 116 required for the starting of a new working process from the position I into the position F effects a repetition of the operations described hereinabove in the inverse succession. When switching over into the position H the chambers 1041 and 891 are relieved. The spring 98 presses the pawl 103 onto the ratchet wheel 94 whereby the control shaft 88 is again locked against rotational movements in the clockwise direction. The oil can flow off into the basin on the path described hereinabove. As soon as the lever 119 is turned further on into the position G, pressure oil flows into the chamber 1003. The grinder carriage 70 moves towards the right towards the work piece. This movement comes to an end when the front wall 794 of the piston abuts on the double armed lever which is in contact with the pindle 86. It is to be noted that in these conditions the two pawls 96, 97 are not yet in contact with the ratchet wheel 94. Provided the grinding worm 9 is not yet in contact with the work piece 10 (yet unground), the grinder carriage 70 can now be shifted further towards the right through the control shaft 88 and the spindle 86 by turning the hand wheel 91 in the anticlockwise direction, until engagement almost free from backlash is established, and the conditions for the beginning required for the automatically performed grinding process are set up. This arrangement of the feed device gives good service, particularly when grinding work pieces which have an unequal grinding allowance. The two pawls 96, 97 are now lowered onto the ratchet wheel 94, as soon as the lever 119 and associated valve 116 are turned into the position F. In order to initiate the automatically performing working process as disclosed in the foregoing description of the two-way grinding, the lever 117 has to be put into the position B.

(b) *One-way grinding*

In one-way grinding the grinding process is carried out during the upward movement of the work slide 4 only. At the beginning of the downward movement which is performed at a rapid speed, the grinder carriage 70 is withdrawn from the work piece a short distance. At the beginning of the subsequent upward movement the advance of the grinder carriage 70 is effected. Moreover the feed mechanism performs at the same time a feeding movement so that the grinder carriage 70 at the end of its movement towards the right hand side not only reaches the position formerly attained but has covered a path beyond this position, which is coordinated to the feeding movement. After the completion of the grinding process the work slide 4 is always brought to a standstill in the upper end position i. e. at the end of the last upward stroke.

For the description of this control program a start will be made from the fact that the two levers 117 and 119 and the associated valves 116 and 114 occupy the positions F and A associated with grinding, just the same as it was the case with two-way grinding. The lever 118 and valve 115 are, however, turned into the position E. As a consequence thereof, pressure oil penetrates from the pipe 108 via the pipe 181, the groove 1151 and the pipes 139, 138 into the chamber 931 whereby the pawl 97 is lifted off the ratchet wheel 94. It may be recalled here that in the two-way grinding the control lever 93 initiated a feed movement on the grinder carriage 70 at the beginning of the downward movement of the work slide 4 i. e. at the stroke of the piston 100 from the right to the left. Owing to the lifting-off of the pawl 97 this feed movement can not take place. When grinding, i. e. during the upward stroke of the work slide 4, pressure oil flows from the pipe 108 via the pipe 172, the chamber 1122, the pipe 178, the groove 1154, the pipe 160, the groove 1164 and the pipe 161 into the chamber 1003, and thereby arrests the grinder carriage 70 in the operative position. The oil required for the upward stroke and to be fed into the chamber 562 passes from the pressure pipe 108 thereto through the pipe 149, the groove 1153, the pipe 152, the variable delivery pump 58, the pipe 153, the chamber 1114, the pipes 154, 155, the groove 1143 and the pipe 156. Since the oil flowing into the chamber 562 passes through the variable delivery pump 58 the upward stroke is performed at working speed. At the end of the upward stroke the stop 60 contacts the control lever 621 whereby the switch 622 is closed and the coil 168 is energized as described hereinabove. The lever 135 accordingly turns in the clockwise direction whereby the piston 112 is shifted towards the right, and subsequently the piston 111 is shifted towards the left. As soon as this shifting of the two pistons 111, 112 is terminated, in the one-way grinding at present under consideration the conditions illustrated in Fig. 10 prevail. The oil enclosed in the chamber 562 escapes over the pipe 156, the groove 1143, the pipes 155, 154, the chamber 1114, the pipe 151 and the groove 1152 into the drainage pipe 173 and into the basin. Since the oil expelled by the piston 56 need not now pass through the variable delivery pump 58, the downward stroke is carried out at an express speed rate. The supply of pressure oil to the chamber 1003 is interrupted in this phase of operation. On the other hand there is now communication between the said chamber 1003 and the large chamber 1121 in the control block 113. This chamber 1121 had been totally emptied during the upward stroke of the work slide 4 through the drainage pipe 177, because then communication with the atmosphere existed through the bore 1124. When shifting the piston 112 into the downstroke-position the empty chamber 1121 is repleted at once, because the spring 83 mounted on the spindle 79 expels the quantity of oil corresponding to the volume of the chamber 1121 from the chamber 1003, and passes the same thereto through the pipe 161, the groove 1161, the pipe 160, the groove 1154 and the pipe 178. By this measure it is achieved that the grinder carriage 70 performs a short retrograde movement corresponding to the quantity of oil displaced so that during the downward stroke the contact between the grinding worm 9 and the work piece 10 is interrupted. Since when reversing, just as in two-way grinding, a release of the chambers 992, 893 is effected at once, both pistons 99, 100 move towards the left at once, and the two control levers 92, 93 perform a corresponding rotational movement. Since, however, in these conditions the pawl 96 slides over the ratchet wheel 94 and the pawl 97 is permanently lifted off, no feed movement can take place at the beginning of the downward stroke of the work piece carriage 4.

At the end of the downward stroke of the work slide 4 the switching-over process is triggered off by the stop 61 in the manner described. As soon as both pistons 111, 112 have performed the switching-over movement and assume the position represented in Figs. 9 and 9a, the work slide 4 begins at once to rise at working speed, since the oil passed into the chamber 562 must now again pass through the variable delivery pump 58. At the same time pressure oil penetrates from the pipe 108 into the chamber 1003 via the pipe 172, the chamber 1122, the pipe 178, the groove 1154, the pipe 160, the groove 1164 and the pipe 161, which has the consequence that the grinder carriage 70 is at once advanced into the working position. Since at the same moment pressure oil passes through the pipes 146 and 147 respectively, into the chambers 992 and 893, respectively, both pistons 99, 100 are shifted at once towards the right. This effects a feeding movement of the control shaft 88 and a feed movement of the grinder carriage 70 and a small displacement of the piston 104 towards the left.

It is to be noted that the grinder carriage 70 not only assumes now that position which it had occupied prior to the beginning of the return movement described at the beginning of the downward stroke of the work slide 4, but is moved beyond the same by the magnitude of the aforesaid feed movement, initiated at the beginning of each upward stroke of the work slide 4, in the direction towards the work piece 10. The chamber 1121 is completely discharged through the drainage pipe 177 during the upward stroke.

The grinding process proceeds in this way until the work piece 10 is ground to a finish, i. e. until the piston 104 has moved so far to the left that the control rod 105 is able to open the switch 106 at the beginning of the last upward stroke of the work slide 4. As soon as the latter has reached the upper end position, it comes there to a standstill because the electrical connection to the coil 168 required for initiating the downward stroke can not be established owing to the switch 106 being opened. The manipulations to be carried out subsequently are substantially the same as those explained with reference to the two-way grinding. The only difference to be mentioned is, that when switching-over the lever 119 and associated valve 116 into the position G, the pawl 96 only is lifted off because the pawl 97 had already been removed from the ratchet wheel 94 when switching-over the lever 118 and associated valve 115 into the position E determining the one-way grinding.

While I have described and illustrated what may be considered as a typical and particularly useful embodiment of my said invention I wish it to be understood that I do not limit myself to the details and dimensions described and illustrated, for obvious modifications will occur to a person skilled in the art.

What I claim as my invention and desire to secure by Letters Patent, is:

1. A machine for the grinding of spur gears and helical gears by the generating principle, comprising in combination: a base, a carriage mounted for horizontal movement on said base, a grinding worm rotatably mounted on said carriage about a horizontal axis extending at right angles to the direction of movement of said carriage, a work slide carrier mounted rotatably adjustable about a horizontal axis extending parallel to the direction of movement of said carriage in a support on said base, a work slide mounted on said work slide carrier, means for guiding said work slide for reciprocative movement on said carrier at right angles to the axis of rotation of said slide carrier, said work slide being provided with a drive and means for rotatably supporting a work piece, control means connected to said carriage for moving said grinding worm transversely to its axis of rotation in and out of grinding contact with the work piece, mounted on said work slide, and switch-over means connected to the said control means and having one position in which the said grinding worm is kept in grinding contact with the said work piece during the movement of the said slide in one direction only, and another position in which the said grinding worm is kept in grinding contact with the said work piece during both directions of movement of the said slide.

2. A machine for the grinding of spur gears and helical gears as claimed in claim 1, comprising in addition: a power consumer built into said drive for the work piece, a work piece supporting said driving shaft, the torque of said drive being so dimensioned that the variations in torque applied to said work supporting and driving shaft during the grinding of said work piece remaining ineffective and the whole drive during the grinding of helical gears being permanently loaded in such a manner that the elements of the said drive of the work piece contact one another always with the same contact faces, regardless of the direction of movement of the said work slide.

3. A machine for the grinding of spur gears and helical gears as claimed in claim 1, including manually operable control means and means for operatively connecting said switch-over means to said manually operable control means in such a manner that, by selecting the method of operation of the machine by setting the said switch-over means to one of the said positions at the same time the sequence of the automatically performed feed movements is determined in such a manner that in both dead center positions of the said reciprocable work slide a feed is effected when grinding is carried out in both directions of movement of the said work slide, and that the said grinding worm is fed towards the said work piece at the beginning of that movement only of the said work slide during which grinding is effected when grinding is carried out in one direction of movement only of the said slide.

4. A machine for the grinding of spur gears and helical gears as claimed in claim 1, including in said control means a hydraulically operated ratchet- and pawl-mechanism having at least two pawls, both the said pawls being alternately operative in the adjustment operation when grinding is effected in both directions of movement of the said work slide, whereas one of the said pawls is operative in the said adjustment operation when grinding is effected in one direction of movement only of the said work slide while the other one of the said pawls is kept in an inoperative position in the said ratchet- and pawl-mechanism.

References Cited in the file of this patent
UNITED STATES PATENTS

| | | |
|---|---|---|
| 2,385,650 | Rickenmann | Sept. 25, 1945 |
| 2,424,191 | Rickenmann | July 15, 1947 |
| 2,595,591 | Lohutko | May 6, 1952 |
| 2,642,702 | Staples | June 23, 1953 |